US010607788B2

(12) United States Patent
Yang et al.

(10) Patent No.: US 10,607,788 B2
(45) Date of Patent: Mar. 31, 2020

(54) AEROGEL CAPACITOR AND METHOD FOR MANUFACTURING THE SAME

(71) Applicant: SAMSUNG ELECTRO-MECHANICS CO., LTD., Suwon-Si, Gyeonggi-Do (KR)

(72) Inventors: Jeong Suong Yang, Suwon-si (KR); Woong Do Jung, Suwon-si (KR); Tae Joon Park, Suwon-si (KR); Ho Phil Jung, Suwon-si (KR); Jong Suk Han, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/976,540

(22) Filed: May 10, 2018

(65) Prior Publication Data

US 2019/0103234 A1    Apr. 4, 2019

(30) Foreign Application Priority Data

Sep. 29, 2017  (KR) .................. 10-2017-0128097
Nov. 24, 2017  (KR) .................. 10-2017-0158295

(51) Int. Cl.

| *H01G 11/24* | (2013.01) |
| *H01G 11/36* | (2013.01) |
| *H01G 9/07* | (2006.01) |
| *H01G 9/00* | (2006.01) |
| *H01G 9/048* | (2006.01) |
| *H01G 4/06* | (2006.01) |
| *H01G 11/26* | (2013.01) |
| *H01G 4/20* | (2006.01) |
| *H01G 4/008* | (2006.01) |

(52) U.S. Cl.
CPC ............. *H01G 11/24* (2013.01); *H01G 4/008* (2013.01); *H01G 4/06* (2013.01); *H01G 4/203* (2013.01); *H01G 4/206* (2013.01); *H01G 9/0032* (2013.01); *H01G 9/048* (2013.01); *H01G 9/07* (2013.01); *H01G 11/26* (2013.01); *H01G 11/36* (2013.01)

(58) Field of Classification Search
CPC ........ H01G 11/24; H01G 4/06; H01G 9/0032; H01G 9/048; H01G 9/07; H01G 11/36
USPC ........................................................ 361/502
See application file for complete search history.

(56) References Cited

U.S. PATENT DOCUMENTS

| 8,385,046 B2 | 2/2013 | Palusinski et al. |
| 9,053,870 B2 | 6/2015 | Yu et al. |
| 2012/0099242 A1 | 4/2012 | Ohyama et al. |
| 2014/0016245 A1* | 1/2014 | Bromer ................. B82Y 10/00 |
| | | 361/502 |

(Continued)

FOREIGN PATENT DOCUMENTS

JP    4491214 B2    6/2010

*Primary Examiner* — Michael P McFadden
(74) *Attorney, Agent, or Firm* — Morgan, Lewis & Bockius LLP

(57) ABSTRACT

An aerogel capacitor includes: a substrate including a capacitor structure including an aerogel, a dielectric layer and a conductive layer, and a support surrounding the capacitor structure; and an electrode unit including a first electrode and a second electrode provided on the substrate. The first electrode is connected to the aerogel and the second electrode is connected to the conductive layer.

15 Claims, 2 Drawing Sheets

(56) References Cited

U.S. PATENT DOCUMENTS

2014/0098462 A1\* 4/2014 Farmer ................ H01G 11/28
                                                           361/502
2014/0268490 A1   9/2014  Tsai et al.
2016/0329158 A1   11/2016 Hattori et al.
2017/0345577 A1\* 11/2017 Nakaiso ................ H01G 4/008

\* cited by examiner

AEROGEL CAPACITOR AND METHOD FOR MANUFACTURING THE SAME

CROSS-REFERENCE TO RELATED APPLICATION(S)

This application claims the benefit of priority to Korean Patent Application Nos. 10-2017-0128097 filed on Sep. 29, 2017 and 10-2017-0158295 filed on Nov. 24, 2017 in the Korean Intellectual Property Office, the disclosure of which is incorporated herein by reference in its entirety.

BACKGROUND

1. Field

The present disclosure relates to an aerogel capacitor and a method for manufacturing the same.

2. Description of Related Art

As multilayer ceramic condensers (MLCC) reach the limit of capacity thereof, capacitors having high capacity have continuously been developed. In particular, a capacitor using aerogel has recently been developed.

Aerogel is a new type of material having specific physical properties, such as enthalpy and density, between those of a liquid and a gas. Aerogel may be formed by substituting a gel solution, formed by a sol-gel solution reaction, with air, such that a low density aerogel structure, lighter than air, may be manufactured.

An aerogel capacitor forming a multilayer structure of metal/dielectric/metal on an aerosol structure using atomic layer deposition (ALD) is attracting attention due to characteristics thereof of high surface area per unit volume. Recently, an aerogel capacitor having a porous structure has been developed. However, a method of forming an external electrode on an aerogel capacitor and a method of connecting an external electrode to an internal electrode provided therein has not been secured.

SUMMARY

An aspect of the present disclosure may provide an aerogel capacitor allowing an external electrode to be easily connected to an internal electrode of a capacitor structure.

According to an aspect of the present disclosure, an aerogel capacitor includes: a substrate including a capacitor structure including an aerogel, a dielectric layer and a conductive layer, and a support surrounding the capacitor structure; and an electrode unit including a first electrode and a second electrode provided on the substrate. The first electrode is connected to the aerogel and the second electrode is connected to the conductive layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
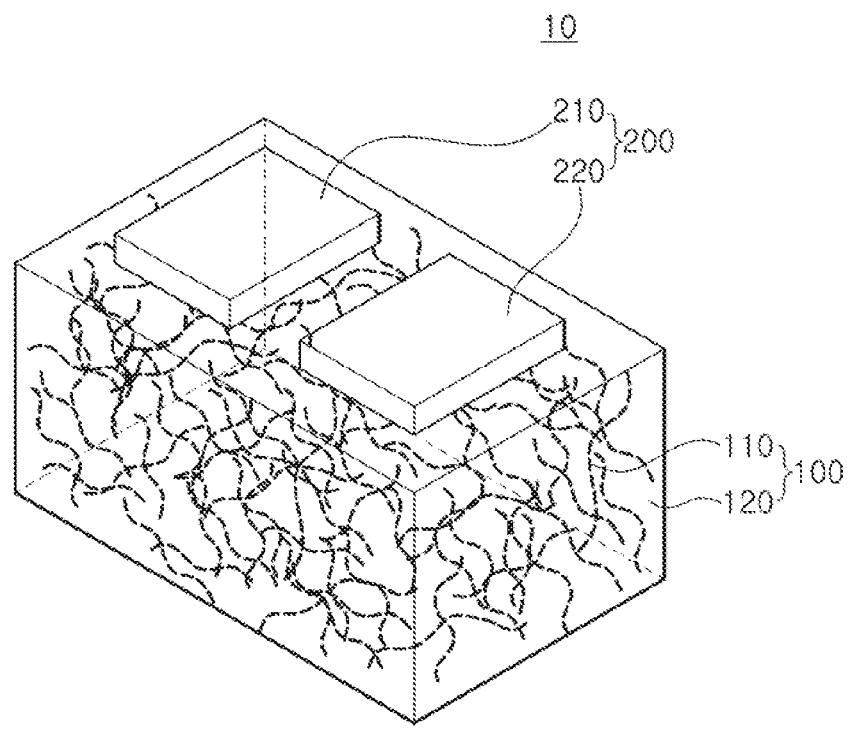
FIG. 1 is a perspective view of an aerogel capacitor according to an exemplary embodiment in the present disclosure.

FIG. 1 is a perspective view of an aerogel capacitor according to an exemplary embodiment in the present disclosure.

Referring to FIG. 1, the aerogel capacitor 10 may include a substrate 100 and an electrode unit 200.

The substrate 100 may include a capacitor structure 110 and a support 120. The capacitor structure 110 may have a tube shape. At least one capacitor structure 110 having the tube shape may be provided, and the at least one capacitor structure 110 may be elongated to be disposed in a form in which thin tubes are entangled.

Figure 2:
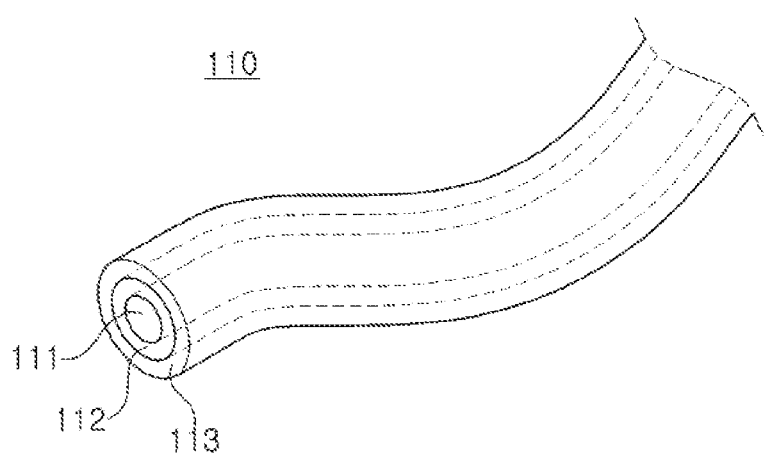
FIG. 2 is an enlarged view of a capacitor structure according to an exemplary embodiment in the present disclosure.

FIG. 2 is an enlarged view of a capacitor structure according to an exemplary embodiment in the present disclosure.

Referring to FIG. 2, the capacitor structure 110 may include aerogel 111, a dielectric layer 112 surrounding the aerogel 111, and a conductive layer 113 surrounding the dielectric layer 112. The capacitor structure 110 may have the dielectric layer 112 and the conductive layer 113 concentrically formed around the aerogel 111, such that aerogel 111 is at the center.

The aerogel 111 may include at least one of carbon nanotubes (CNT) and multi-walled carbon nanotubes (CNT). The aerogel 111 may correspond to an internal electrode of the capacitor structure 110. The aerogel 111 may have a tube shape similar to the overall structure of the capacitor structure 110, and the aerogel 111 having the tube shape may be elongated to be disposed in a form in which thin tubes are entangled. The aerogel 111 may be disposed in the form in which the thin tubes are entangled in the substrate 100, and thus may have a porous structure in which a space is provided in an area in the substrate 100 in which the aerogel 111 is not disposed.

The dielectric layer 112 and the conductive layer 113 may be sequentially formed on the aerogel 111. The dielectric layer 112 may be provided on the aerogel 111 in the form of surrounding the tube-shaped aerogel 111 and may also have the tube shape in which the aerogel 111 is included in the dielectric layer 112. Similar to the dielectric layer 112, the conductive layer 113 may be provided on the dielectric layer 112 in the form of surrounding the tube-shaped dielectric layer 112, and thus may also have the tube shape in which the dielectric layer 112 is included in the conductive layer 113. As an example, the dielectric layer 112 and the conductive layer 113 may be sequentially formed by atomic layer deposition (ALD).

The capacitor structure 110 having the structure of the aerogel 111-dielectric layer 112-conductive layer 113 may serve as a capacitor in the substrate 100. Here, the aerogel 111 and the conductive layer 113 may correspond to internal electrodes in the capacitor structure, and the dielectric layer 112 may correspond to the dielectric in the capacitor structure.

Referring back to FIG. 1, the support 120 may surround the capacitor structure 110. The support 120 may fill a porous area of the substrate 100 in which the capacitor structure 110 having the form in which the thin tubes are entangled is not disposed. The support 120 may put in the inner space of the porous area of the substrate 100, such that an appearance of the substrate 100 may be formed. As an example, the support 120 may include at least one of polymer and epoxy.

The electrode unit 200 may be provided on the substrate 100, and the electrode unit 200 may include a first electrode 210 and a second electrode 220. Here, the first electrode 210 and the second electrode 220 may correspond to external electrodes of the aerogel capacitor 10.

The first electrode 210 may be connected to the aerogel 111 and the second electrode 220 may be connected to the conductive layer 113.

As described above, the capacitor structure 110 may be formed by sequentially depositing the dielectric layer 112 and the conductive layer 113 on the aerogel 111. At this time, the first electrode 210 may be connected to the aerogel 111 before the deposition of the dielectric layer 112 and the conductive layer 113. Thereafter, the dielectric layer 112 and the conductive layer 113 may be sequentially deposited on the aerogel 111 in a state where the aerogel 111 and the first electrode 210 are connected to each other, such that the capacitor structure 110 may be formed.

The second electrode 220 may be connected to the capacitor structure 110 having the porous structure after the deposition of the dielectric layer 112 and the conductive layer 113, such that the second electrode 220 and the conductive layer 113 corresponding to an outermost layer of the capacitor structure 110 may be connected. The support 120 may put in the porous area of the substrate 100 in the state in which the conductive layer 113 and the second electrode 220 are connected to each other.

Although FIG. 1 illustrates that the first electrode 210 and the second electrode 220 are formed on an upper surface of the substrate 100, according to the exemplary embodiment, the first electrode 210 and the second electrode 220 may be formed on at least one of a side surface and a lower surface of the substrate 100 and the first electrode 210 and the second electrode 220 may also be formed on different surface of the substrate 100.

In addition, although the first electrode 210 and the second electrode 220 are illustrated as solid electrodes in FIG. 1, the first electrode 210 and the second electrode 220 may be formed by a conductor line formed in a mesh form to increase the contact area.

Figure 3:
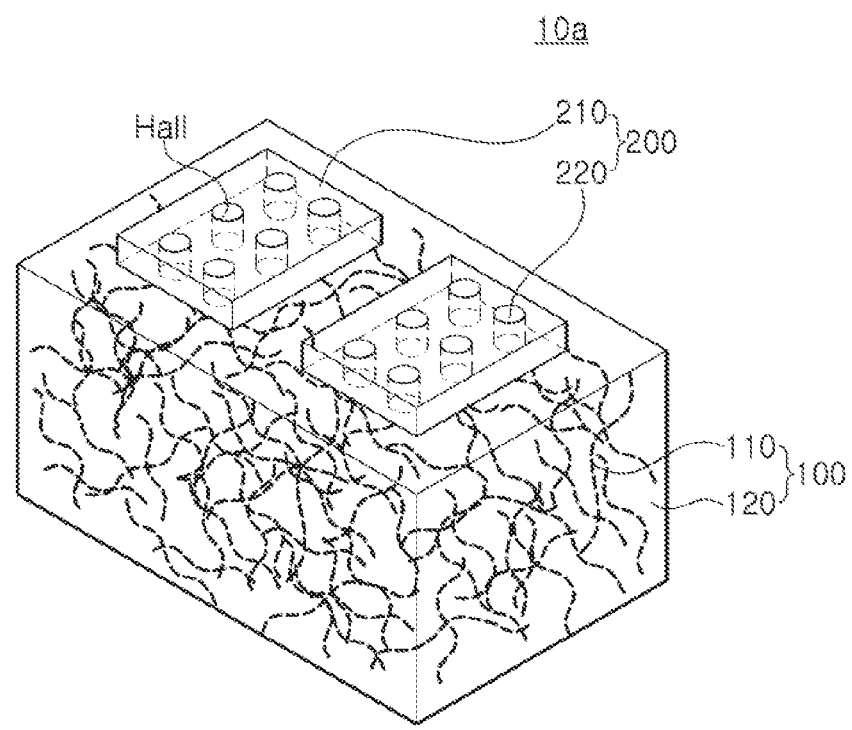
FIG. 3 is a perspective view of an aerogel capacitor according to another exemplary embodiment in the present disclosure.

FIG. 3 is a perspective view of an aerogel capacitor according to another exemplary embodiment in the present disclosure.

An aerogel capacitor 10a according to the exemplary embodiment in FIG. 3 may be similar to the aerogel capacitor 10 according to the exemplary embodiment in FIG. 1, and therefore a duplicate description of the aerogel capacitor 10a and the aerogel capacitor 10 will be omitted and a difference between the aerogel capacitor 10a and the aerogel capacitor 10 will be mainly described.

Referring to FIG. 3, each of the first electrode 210 and the second electrode 220 of the electrode unit 200 may include at least one hall. In addition, according to the exemplary embodiment, at least one hall may be provided in at least one of the first electrode 210 and the second electrode 220.

As described above, in the aerogel capacitor 10a according to the exemplary embodiment in the present disclosure, the capacitor structure 110 may be formed by sequentially depositing the dielectric layer 112 and the conductive layer 113 on the aerogel 111 in the state in which the aerogel 111 and the first electrode 210 are connected to each other. Thereafter, the aerogel capacitor 10a may be manufactured by putting the support 120 in the porous area of the substrate 100 in the state in which the conductive layer 113 and the second electrode 220 corresponding to the outermost layer of the capacitor structure 110 are connected to each other.

As described above, when the dielectric layer 112 and the conductive layer 113 are sequentially deposited on the aerogel 111 in the state in which the first electrode 210 and the aerogel 111 are connected to each other, the deposited dielectric layer 112 and conductive layer 113 may be blocked by the first electrode 210, thereby lowering a yield. Similarly, when the support 120 is put in the state in which the second electrode 220 and the conductive layer 113 are connected to each other, the support 120 may be blocked by the first electrode 210 and the second electrode 220, thereby lowering the yield.

According to the exemplary embodiment in the present disclosure, at least one hall may be provided in the first electrode 210 to sequentially and easily deposit the dielectric layer 112 and the conductive layer 113 on the aerogel 111 through the hall. On the other hand, at least one hall may be provided in the first electrode 210 and the second electrode 220 so that the support 120 may be easily filled in the inner space of the capacitor structure 110 having the porous structure through the hall.

Figure 4:
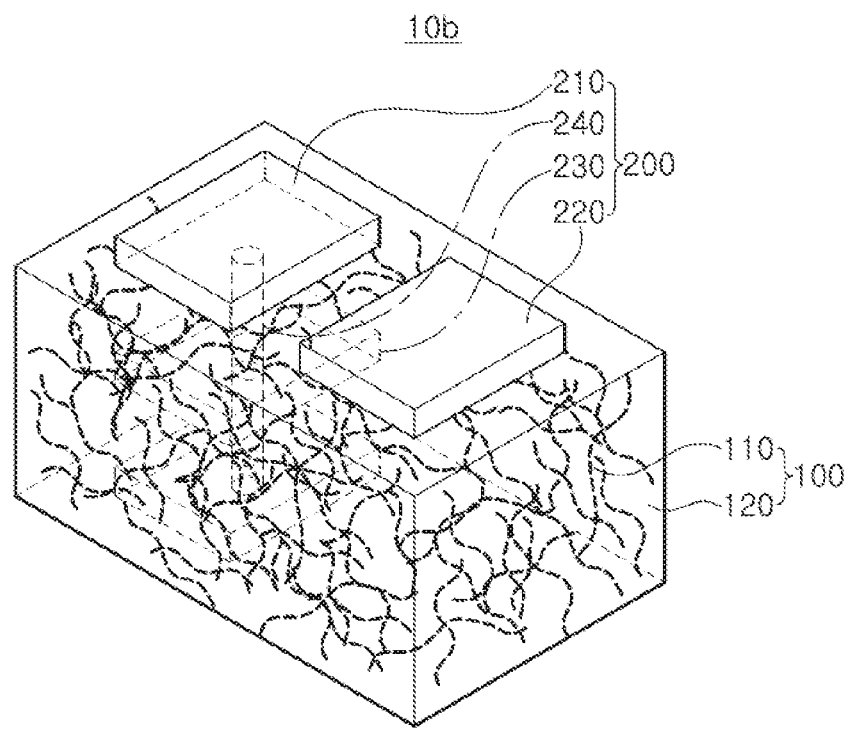
FIG. 4 is a perspective view of an aerogel capacitor according to still another exemplary embodiment in the present disclosure.

FIG. 4 is a perspective view of an aerogel capacitor according to still another exemplary embodiment in the present disclosure.

An aerogel capacitor 10b according to the exemplary embodiment in FIG. 4 may be similar to the aerogel capacitor 10 according to the exemplary embodiment in FIG. 1, and therefore a duplicate description of the aerogel capacitor 10b and the aerogel capacitor 10 will be omitted and a difference between the aerogel capacitor 10b and the aerogel capacitor 10 will be mainly described.

Referring to FIG. 4, the electrode unit 200 may further include at least one auxiliary electrode 230 and a via 240 connected to the first electrode 210. The via 240 may interconnect the at least one auxiliary electrode 230 and connect the first electrode 210 to the at least one auxiliary electrode 230. The first electrode 210 may be provided on one side of the substrate 100 and at least one auxiliary electrode 230 and the via 240 may be embedded in the substrate 100. At least one auxiliary electrode 230 may be provided in an internal layer of the substrate 100.

The aerogel capacitor 10b according to the exemplary embodiment in the present disclosure may be manufactured by forming the aerogel 111 in the area in which the at least one auxiliary electrode 230 and the via 240 are provided to electrically connect the aerogel 111 to the at least one auxiliary electrode 230 and the via 240 and electrically connecting the via exposed to one side of the aerogel 111 to the first electrode 210.

According to an exemplary embodiment in the present disclosure, the auxiliary electrode 230 electrically connected to the first electrode 210 may be provided in the substrate 100 to increase a contact area between the aerogel 111 used as the internal electrode and the external electrode, thereby effectively reducing an equivalent series resistance.

In addition, although the exemplary embodiment described above describes that the electrode unit 200 includes the auxiliary electrode 230 and the via 240 connected to the first electrode 210, the electrode unit 200 may further include the auxiliary electrode and the via connected to the second electrode 220. In this case, the auxiliary electrode and the via connected to the second electrode 220 may be electrically connected to the conductive layer 113.

As set forth above, according to the exemplary embodiment in the present disclosure, the aerogel capacitor may easily connect the external electrode to the internal electrode of the capacitor structure.

While exemplary embodiments have been shown and described above, it will be apparent to those skilled in the art that modifications and variations could be made without departing from the scope of the present disclosure as defined by the appended claims.

What is claimed is:

1. An aerogel capacitor, comprising: a substrate including a capacitor structure including an aerogel, a dielectric layer and a conductive layer, and a support surrounding the capacitor structure; and an electrode unit including a first electrode and a second electrode disposed on the substrate, wherein the first electrode is connected to the aerogel and the second electrode is connected to the conductive layer, wherein at least one of the first electrode or the second electrode includes at least one hall, and wherein the at least one hall extends to the substrate.

2. The aerogel capacitor of claim 1, wherein the aerogel includes at least one of carbon nanotubes (CNT) or multi-walled carbon nanotubes (CNT).

3. The aerogel capacitor of claim 1, wherein the capacitor structure has a tube shape, and includes the aerogel at the center, the dielectric layer surrounding the aerogel, and the conductive layer surrounding the dielectric layer.

4. The aerogel capacitor of claim 1, wherein the dielectric layer is formed to at least partially surround the aerogel, and the conductive layer is formed to at least partially surround the dielectric layer.

5. The aerogel capacitor of claim 4, wherein the dielectric layer and the conductive layer are formed by atomic layer deposition.

6. The aerogel capacitor of claim 1, wherein the aerogel and the conductive layer correspond to internal electrodes in the capacitor structure and the dielectric layer corresponds to a dielectric in the capacitor structure.

7. The aerogel capacitor of claim 1, wherein the electrode unit further includes at least one auxiliary electrode and a via formed in the substrate.

8. The aerogel capacitor of claim 7, wherein the at least one auxiliary electrode is disposed on an internal layer of the substrate.

9. The aerogel capacitor of claim 1, wherein at least one of the first electrode or the second electrode has a mesh form.

10. A method for manufacturing an aerogel capacitor, comprising steps of: providing an aerogel having a cylindrical shape; connecting the aerogel to a first electrode disposed on a substrate; forming a dielectric layer and a conductive layer sequentially on the aerogel; and connecting the conductive layer to a second electrode disposed on the substrate, wherein at least one of the first electrode or the second electrode includes at least one hall, and wherein the at least one hall extends to the substrate.

11. The method of claim 10, wherein the aerogel includes at least one of carbon nanotubes (CNT) or multi-walled carbon nanotubes (CNT).

12. The method of claim 10, wherein, in the step of forming the dielectric layer and the conductive layer, the dielectric layer and the conductive layer are sequentially formed concentrically around the aerogel, such that the aerogel is at a center.

13. The method of claim 10, wherein the dielectric layer and the conductive layer are deposited on the aerogel by atomic layer deposition.

14. The method of claim 10, further comprising:
   forming a support surrounding a capacitor structure including the aerogel, the dielectric layer, and the conductive layer.

15. The method of claim 10, further comprising:
   forming at least one auxiliary electrode on an internal layer of the substrate.

* * * * *